INVENTOR.
JAMES S. TAPP

BY

ATTORNEY

United States Patent Office 3,458,468
Patented July 29, 1969

3,458,468
VINYL HALIDE POLYMERS CONTAINING VINYL HALIDE POLYMER COMPOSITIONS CONTAINING LOW DENSITY POLYETHYLENE
James S. Tapp, Dayton, Ohio, assignor to Monsanto Company, St. Louis, Mo., a corporation of Delaware
Filed Nov. 20, 1967, Ser. No. 684,198
Int. Cl. C08f 29/24, 45/26
U.S. Cl. 260—31.8                      7 Claims

ABSTRACT OF THE DISCLOSURE

Vinyl halide polymer compositions are plasticized with a mixture consisting of a conventional vinyl plasticizer and a low density polyethylene powder having an average particle size less than 20 microns, then molded to form shaped articles having greater flexibility and longer retention of plasticizer with time.

BACKGROUND OF THE INVENTION

This invention relates to plasticizers for vinyl halide polymers and, more particularly, to novel plasticizer compositions and their use in preparing polyvinyl halide shaped articles having improved flexibility and performance both initially and under long term aging conditions.

It is well known in the plastics molding art that shaped structures of good mechanical properties and thermal stability can be prepared from thermoplastic vinyl halide polymers such as polyvinyl chloride and copolymers of vinyl chloride with other vinyl monomers. These polymers, when mixed with plasticizers and formed at elevated temperatures, yield a variety of shaped articles, for example, sheets, tubes, containers, pipes, building profiles and other applications where outsanding resistance to concentrated acids, alkalies, water and alcohols is desirable.

One of the problems in the use of such shaped articles has been the tendency to brittleness and cracking associated with loss of plasticizer with long term exposure and with temperatures substantially below 0° C. Also the strength and ductility is often adversely affected by the use of various molding aids and molding lubricants.

SUMMARY OF THE INVENTION

This invention relates to the use of ultrafine polyethylene powder as a solid plasticizer in combination with conventional liquid plasticizers to prepare polyvinyl halide compositions with improved properties.

DETAILED DESCRIPTION AND PREFERRED EMBODIMENTS

Figure 1:
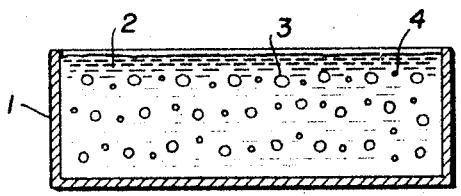
FIGURE 1 shows mold 1 containing a mixture of liquid plasticizer 2 with random size vinyl particles 3 of a typical vinyl halide polymer and interdispersed therewith a moiety of low denstity, polyethylene microparticles 4.
Figure 2:
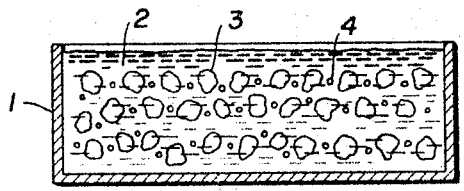
FIGURE 2 is the same mixture after phase inversion, with liquid plasticizer 2 having substantially penetrated throughout each of the vinyl particles 3 causing a degree of swelling and leaving the microparticles 4 unaffected, since they cannot be penetrated, and distributed preferentially at the boundaries between the individual vinyl particles 3.

The compositions of this invention are prepared by mixing the vinyl halide polymer with a conventional liquid vinyl plasticizer and a suitable amount of ultrafine polyethylene powder. The polyethylene, in the form of uniform substantially spherically shaped particles having an average particle size of from 8 to 20 microns, a melt index of 22 g./10 min. and a density of 0.915 g./cu. cm., acts as both a lubricant aid in the molding operation and as a solid plasticizer which is not leached out of the finished product by time or continued use. There is very little loss of flexibility with loss of liquid plasticizer since the polyethylene acts as a solid lubricant, in effect as micro ball bearings which are unaffected by temperature or destructive chemicals, to keep the article flexible and prevent cracking and brittleness.

Suitable vinyl halide polymers for the practice of the invention include homopolymers of vinyl monomers having halogen bound in the molecule and copolymers of vinyl chloride, vinyl bromide, vinylidene chloride, 2-chlorobutadiene, tetrafluoroethylene, trifluoroethylene, difluoro chloro ethylene, and any of the other well known halogen-containing ethylenically unsaturated or vinyl type monomers. Additionally, other vinyl comonomers may be used to prepare copolymers such as vinyl acetate, vinyl methylalcohol, vinyl ethers and the like.

The plasticizing agents which may be employed in preparing the new compositions may be selected from any of the well known liquid vinyl plasticizers such as dioctyl phthalate, dibutyl phthalate, diisocecyl phthalate, diisooctyl phthalate, dicyclohexyl adipate, dioctyl adipate, dibenzyl maleate, trioctyl phosphate, tricresyl phosphate, butyl benzyl phthalate and mixtures thereof with each other and with solid plasticizers such as dicyclohexyl phthalate. It is to be understood, however, that the types of plasticizing agents just mentioned merely represent a prefererd group, and that any of the compounds commonly known as vinyl plasticizers may be employed. From about 1 to 100 parts by weight of plasticizer may be used.

Additional ingredients such as pigments, heat and light stabilizers, anti-static agents and other reagents may be added to the compositions of the invention prior to molding without affecting the polyethylene portion, which may vary from 0.05 to 50 parts by weight.

Any of the conventional molding processes may be used, e.g. extrusion where the mixture is fed through a hopper into a heated extruding barrel and forced through a die by a continuously revolving screw.

The invention is further illustrated by the following examples in which all parts and percents are by weight unless otherwise indicated.

Example I

A 150 gm. portion of Chem-o-sol, commercially available plastisol containing 65 parts vinyl chloride-vinyl acetate copolymer and 35 parts of dioctyl phthalate per 100 parts, was mixed with 15 gm. of polyethylene powder having an average particle size of from 8 to 20 microns then heated in a disc mold to 150° C. and held at that temperature for 3 minutes until the disc was cured.

A second disc was prepared from 150 gm. of Chem-o-sol without any polyethylene powder.

The two samples were then subjected to an accelerated aging test under severe leaching conditions involving exposure to petroleum ether for 30 minutes. At the end of this test the disc containing the polyethylene powder retained most of its flexibility and the disc without any polyethylene powder became stiff and hard.

Example II

Three discs having varying amounts of a copolymer of vinyl chloride and vinyl acetate were cured as in Example I. The proportions were as follows:

(1)

| | Gm. |
|---|---|
| Dioctyl phthalate | 100 |
| 85/15 vinyl chloride vinyl acetate copolymer | 150 |

(2)

| | |
|---|---|
| Dioctyl phthalate | 140 |
| 92/8 vinyl chloride vinyl acetate copolymer | 150 |

(3)

| | |
|---|---|
| Dioctyl phthalate | 150 |
| Polyvinyl chloride | 100 |

All of these discs were less flexible than the polyethylene powder containing one of Example I.

The foregoing detailed description has been given for clearness of understanding only, and unnecessarily limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. A composition comprising a vinyl halide polymer, about 1 to 100 parts by weight of a plasticizer per 100 parts by weight of said polymer and from about 0.05 to 50 parts by weight per 100 parts by weight of said polymer of polyethylene having an average particle size of from about 8 to 20 microns, a melt index of about 22 g./10 min. and a density of about 0.915 g./cu. cm.

2. The composition of claim 1 wherein the polymer is polyvinylchloride.

3. The composition of claim 1 wherein the polymer is a copolymer of vinyl chloride and vinyl acetate.

4. The composition of claim 1 wherein the polymer is a copolymer of vinyl chloride and methyl methacrylate.

5. The composition of claim 1 wherein the polymer is a copolymer of vinyl chloride and vinylidene chloride.

6. The composition of claim 1 wherein the polyethylene is from 1 to 20 parts by weight.

7. The composition of claim 1 wherein the plasticizer is dioctyl phthalate.

References Cited

UNITED STATES PATENTS 2,897,176   7/1959   Rockey et al.
3,046,237   7/1962   Rosenfelder et al.

OTHER REFERENCES

Phillips: Handbook of Polyolefin Standards and Specification; Phillips Petroleum Co.; 1966; pages 28 and 29.

MORRIS LIEBMAN, Primary Examiner

L. T. JACOBS, Assistant Examiner

U.S. Cl. X.R.

260—899